United States Patent [19]

Namiki et al.

[11] Patent Number: 5,423,079
[45] Date of Patent: Jun. 6, 1995

[54] MOBILE COMMUNICATION TERMINAL DEVICE AND METHOD OF PREVENTING INCORRECT INFORMATION REWRITING

[75] Inventors: Hideo Namiki; Motoyoshi Komoda, both of Tokyo, Japan

[73] Assignee: NEC Corporation, Tokyo, Japan

[21] Appl. No.: 94,934

[22] Filed: Jul. 21, 1993

[30] Foreign Application Priority Data

Jul. 24, 1992 [JP] Japan .................. 4-197983

[51] Int. Cl.⁶ .............................. H04B 7/26
[52] U.S. Cl. .................. 455/89; 455/186.1; 379/58; 379/62; 340/825.31; 340/825.34
[58] Field of Search ........... 455/33.1, 89, 185.1, 455/186.1; 379/58, 59, 61.62, 387; 340/825.3, 825.31, 825.34

[56] References Cited

U.S. PATENT DOCUMENTS 5,315,638  5/1994  Mukari .................. 379/58

FOREIGN PATENT DOCUMENTS 0403204 12/1990 European Pat. Off. ........ 379/58
0468790  1/1992 European Pat. Off. ........ 455/89
2645303  3/1990 France .

OTHER PUBLICATIONS

Patent Abstracts of Japan, vol. 15, No. 284 (E-1091) Jul. 18, 1991 & JP-A-03 099 532 (Fujitsu Ltd.) Apr. 24, 1991.

*Primary Examiner*—Reinhard J. Eisenzopf
*Assistant Examiner*—Chi H. Pham
*Attorney, Agent, or Firm*—Ostrolenk, Faber, Gerb & Soffen

[57] ABSTRACT

In a mobile communication terminal device, a serial number for use in charging control of a subscriber and so on is prevented from being incorrectly rewritten and hence the subscriber is prevented from being incorrectly charged. An electrically writable/ersable memory 10 in the mobile communication terminal device includes a first storage region RG1 for storing information as an encoded serial number and a storage region RG2 for storing said serial number before encoding, and further a CPU 2 includes means for decoding said encoded information and comparing it with said unencoded serial number, and disabling the mobile communication terminal upon incoincidence of the decoded information and the unencoded information.

6 Claims, 3 Drawing Sheets

MOBILE COMMUNICATION TERMINAL DEVICE AND METHOD OF PREVENTING INCORRECT INFORMATION REWRITING

BACKGROUND OF THE INVENTION

1. Field of the Invention

The present invention relates to a mobile communication terminal system, and more specifically to a mobile communication terminal device such as that in portable telephone sets and mobile phones capable of preventing pieces of information such as serial numbers each for use in charging control of subscribers and so on from being incorrectly rewritten and to a method of preventing information from being incorrectly rewritten.

2. Description of the Prior Art

Referring to FIG. 1, a prior art mobile communication terminal device is illustrated which comprises a CPU 2, an EEPROM 3 as a ROM capable of electrical writing/erasing, a ROM 4, a RAM 5, a TRX 6 as a transmitter/receiver section, an antenna 7, an interface(I/O) 8, and an I/O connector 9. Herein, upon writing in a storage region RG in the EEPROM 3 a serial number (hereinafter, referred to as ESN) for use in charging control and so on, the CPU 2 receives and analyzes ESN data fed through the I/O connector 9 and the interface 8, and thereafter writes the same in the storage region RG.

Once the mobile communication terminal device 1 calls a signal, the ESN is sent to a base station as data together with a MIN (Mobile Identification Number) as a subscriber's number. In the base station, it is judged on the basis of the received data whether coincidence is attained or not between the combination of the ESN and the MIN and a previously registered corresponding combination, and if so a subscriber identified by that number is charged. In this case, if any information concerning other person's ESN and MIN could incorrectly be obtained and his ESN and MIN could be written in a one's own mobile communication terminal 1, that person would be charged. The MIN is needed to be rewritten after shipping, but the ESN, which is a number inherent to the device, is not needed to be rewritten after it is once written upon shipping. Further, the ESN has no limitation to its writing, and hence it is rewritable with ease once a method of its writing is known.

Such a prior art mobile communication terminal device therefore has a difficulty in that an ESN written in an EEPROM is rewritten with ease by investigating a storage address of the ESN in the EEPROM and rewriting that data.

SUMMARY OF THE INVENTION

To solve the difficulty with the prior art, it is a first object of the prsent invention to provide a mobile communication terminal device wherein information inherent to the device such as the ESN is prevented from being rewritten.

It is a second object of the present invention to provide in a mobile communication terminal device a method of prevention of incorrect rewriting of information inherent to the device.

To achieve the above objects, a mobile communication terminal device according to the present invention is adapted such that an electrically rewritable/erasable memory in a mobile communication terminal includes a first storage region in which information inherent to the device is encoded and stored and a second storage region in which such information is stored without being encoded, and that a CPU includes means which decodes the foregoing encoded information and compares it with the aforementioned serial number, and disables the associated mobile communication terminal if no coincidence is attained therebetween.

A method of preventing incorrect rewriting of information in a mobile communication terminal device according to the present invention comprises the steps of: storing in an electrically writable/erasable memory in a mobile communication terminal device information inherent to said device without decoding the same and storing the same after encoding the same; decoding said information encoded and stored prior to the intiation of speech operation after power supply to the device being turned on and comparing the decoded information with said information stored without being decoded, and disabling the speech operation upon coincidence being attained therebetween.

The above and other objects, features and advantages of the present invention will become more apparent from the following description when taken in conjunction with the accompanying drawings in which preferred embodiments of the present invention are shown by way of illustrative examples.

DETAILED DESCRIPTION OF PREFERRED EMBODIMENT

In what follows, an embodiment of the prsent invention will be described with reference to the accompanying drawings.

Figure 1:
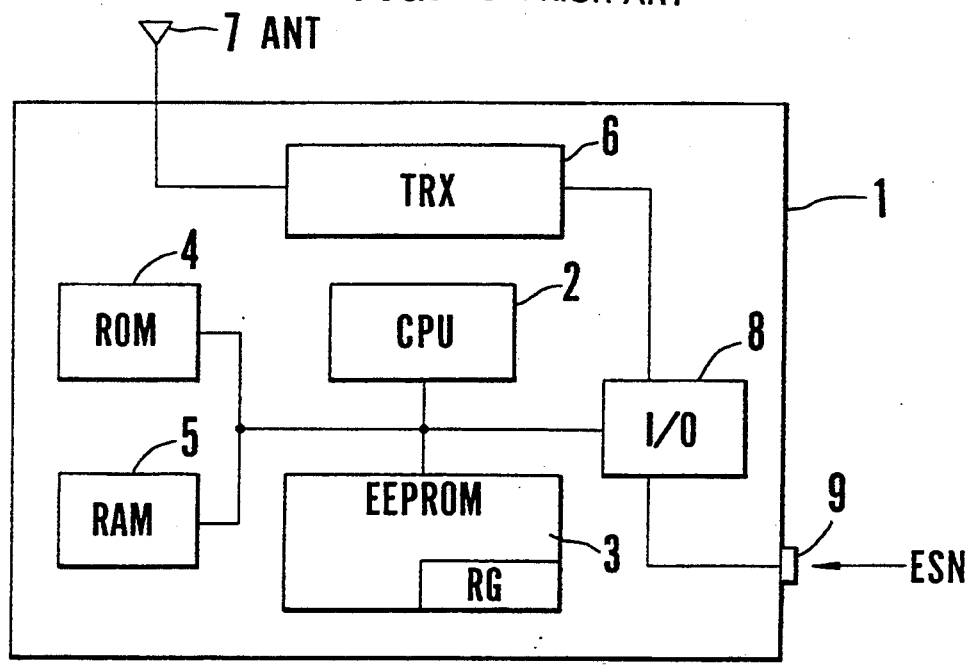
FIG. 1 is a block diagram schematically illustrating a prior art mobile communication terminal device.
Figure 2:
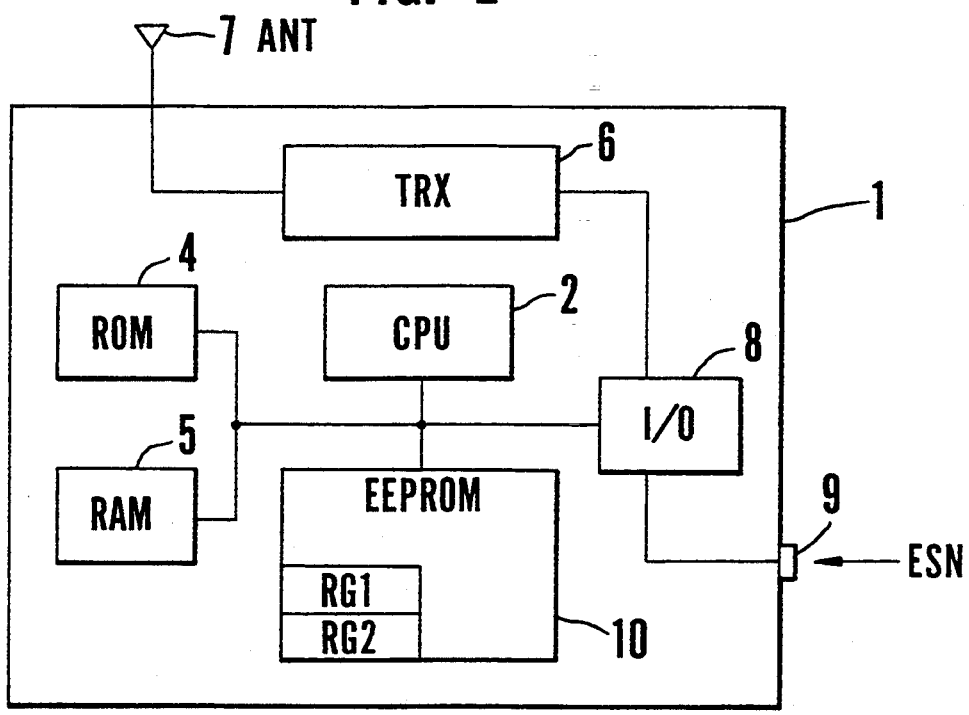
FIG. 2 is a block diagram schematically illustrating a mobile communication terminal device according to the present invention.

Referring to FIG. 2, there is provided a block diagram illustrating a mobile communication terminal device as an embodiment of the present invention. In FIG. 2, symbols identical to those of the prior art example illustrated in FIG. 2 have the same functions. In the present embodiment, an EEPROM 10 includes two storage areas: an area RG1 for storing an ESN(E) after encoding and an area RG2 for storing an ordinary ESN(D) before encoding.

Figure 3:
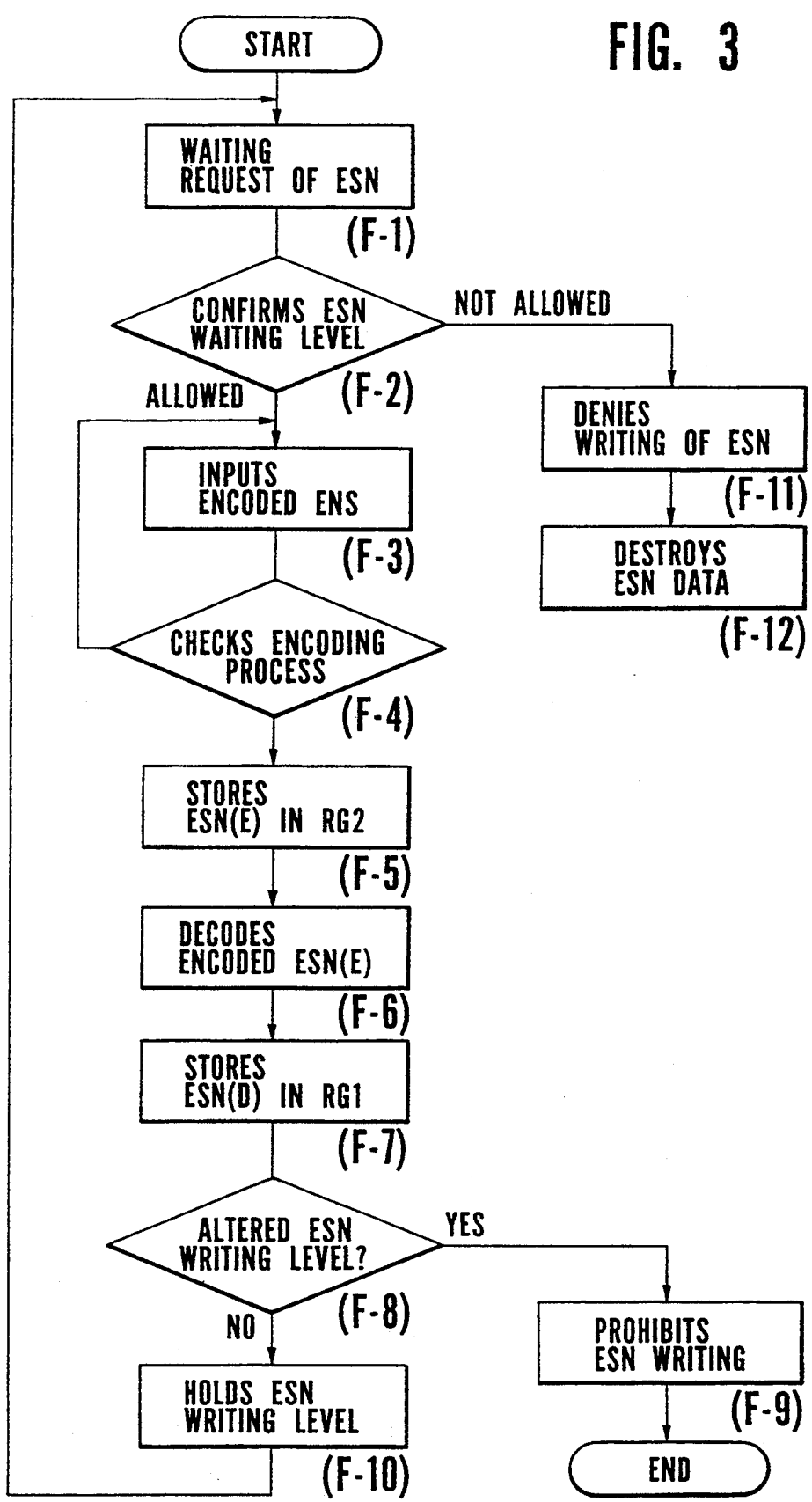
FIG. 3 is a flow chart illustrating a method of preventing incorrect rewriting according to the present invention.

Referring to FIG.3, there is illustrated a method of writing ESN data according to the present invention.

With a writing request upon shipping in step F-1, a CPU 2 confirms an ESN writing level in step F-2. If the writing is allowed, then the ESN(E) encoded in conformity with a predetermined encoding format is inputted through an I/O connector 9 in step F-3. The CPU 2 reads the encoding format and a check code both stored in the ROM 4, and checks that the encoded ESN(E) inputted through the I/O connector 9 is correctly encoded in step F-4. If it is correct, then the encoded ESN(E) is written in the storage region RG2 of the EEPROM 10 in step F-5. Thereafter, the encoded ESN(E)is decoded in step F-6, and an ordinary ESN(D) so decoded is written in the storage region RG1 of the EEPROM 10 in step F-7. Although a writing level of such an ESN is to be altered after the inherent ESN is written in the EEPROM 10 because rewriting thereafter should be prohibited, there is sometimes produced the need of such an ESN being rewritten owing to sudden alteration of the destination of the shipping. For this, it is investigated whether or not the writing level of the ESN has been altered in step F-8. If it has been altered, then writing of ESNs thereafter becomes a prohibition state in step F-9. Unless the writing level of the ESN is altered, then a present ESN writing level is held for the purpose of writing of ESNs thereafter in step F-10. The writing prohibition state or the holding of a writing level, i.e. a writing permission state is stored in a storage region of the EEPROM 10 not illustrated (different from the storage regions RG1 and RG2). If it is now intended that the ESN already written is incorrectly rewritten, then a writing request of the ESN is existent as in the step F-1. The CPU 2 successively confirms the writing level of the ESN as in the step F-2. As a result, since the writing of the ESN has been prohibited in step F-9 provided the ESN writing level has been altered in the step F-8, the writing of the ESN, i.e. rewriting of the same is denied in step F-11 and the ESN already written is destroyed in step F-12 to disable the mobile communication terminal device 1. Hereby, incorrect rewriting of the ESN after shipping is prevented.

Any mobile communication terminal device once prohibited as such in writing thereinto is impossible to be altered without replacing the EEPROM with a new one.

Figure 4:
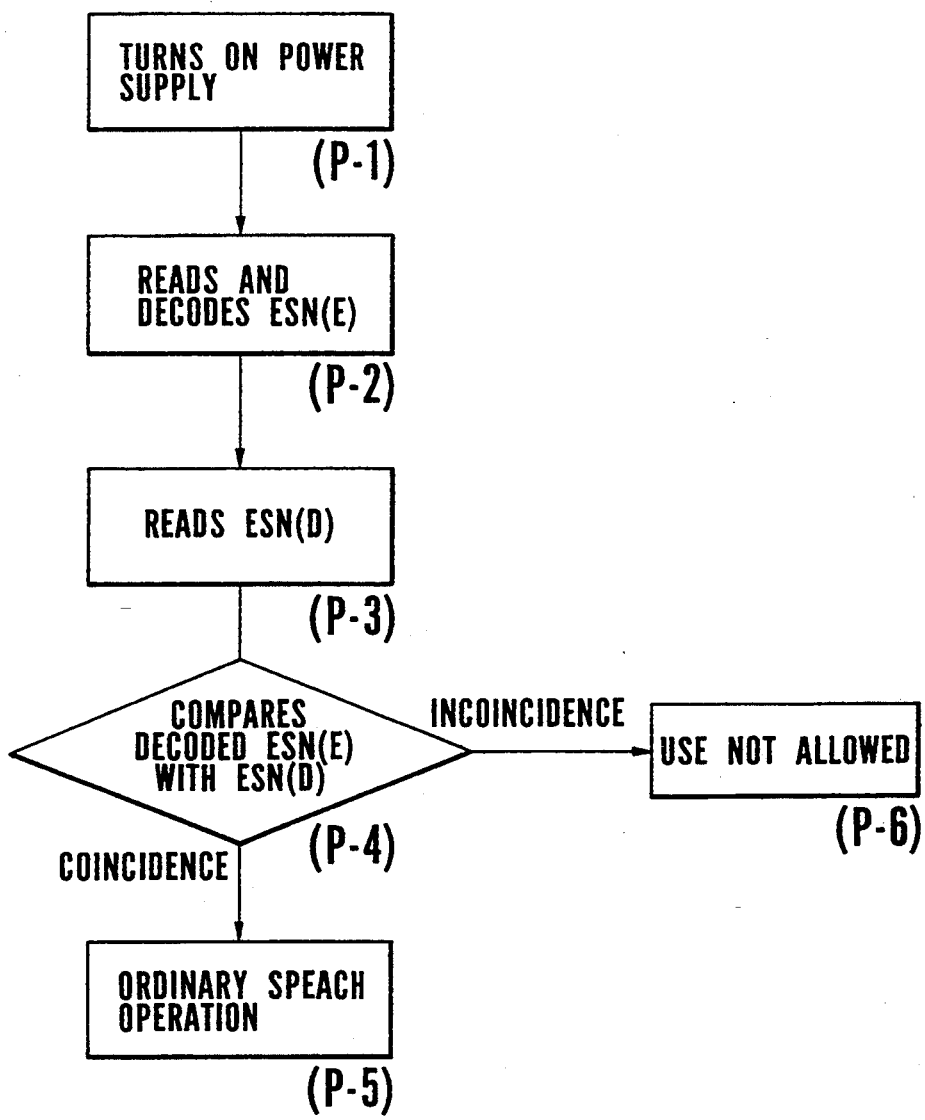
FIG. 4 is a flow chart illustrating writing of a serial number (ESN) in the present invention.

Referring to FIG. 4, there is illustrated a method of preventing incorrect charging according to the present invention.

With a power supply turned on by a subscriber upon the use of the mobile communication terminal device 1, the CPU2 reads and decodes the encoded ESN(E) stored in the storage region RG2 of the EEPROM 10 in step P-2, and further reads the uncoded ESN(D) from the storage region RG1 of the EEPROM 10 in step P-3, for comparison therebetween in step P-4. As a result, if both are coincident, then the operation advances ordinary speech operation in step P-5, but if they are not coincident, then the operation is directed to displaying and the device is disabled in step P-6.

A result of the comparison in the step P-4 becomes thus incoincident provided the ESN has incorrectly been rewritten, and hence no charging is required to prevent incorrect charging from being performed.

According to the present invention, as described above, an ESN is doubly stored in the EEPROM, and both are compared upon the power supply being turned on, so that even though an incorrect user rewrites one thereof, the mobile communication terminal device is prevented from being incorrectly used owing to incorrect rewriting of the ESN. Further, since one of the ESNs doubly stored is encoded, both ESNs are unlikely to be rewriten simultaneously against incorrect use of the ESN.

There is further prepared a rewriting prohibition state where an ESN is prohibited from being rewritten and the ESN is brought into the rewriting prohibition state upon shipping. Hereby, even though a transfer process of an ESN is analyzed, rewriting is limited by that data and, ignorance thereof followed by ESN transfer causes the data to be destroyed and hence disables the use of the device.

Although in the aforementioned embodiment a serial number ESN of a mobile communication terminal device is usable for charging control, the present invention is also applicable to prevention of incorrect rewriting of any other data written in the device.

What is claimed is:

1. A method of preventing any information inherent to a mobile communication terminal device from being incorrectly rewritten, said method to be performed at the mobile communication terminal device, the method comprising the steps of:

storing information inherent to the mobile communication terminal device as stored information in an electrically writable/erasable memory without encoding the information and encoding the information and storing the information after encoding as encoded information in an electrically writable/erasable memory;

decoding said encoded information and reading said stored information prior to initiation of speech operation of said device after said device is supplied with power and comparing the decoded encoded information with said stored information; and disabling, responsive to the step of comparing, the speech operation upon incoincidence between the decoded encoded information and the stored information.

2. A method of preventing any information inherent to a mobile communication terminal device according to claim 1 wherein said information is a serial number of said mobile communication terminal device.

3. A method of preventing any information inherent to a mobile communication terminal device according to claim 1 wherein said comparison between said decoded encoded information and said stored information is performed upon the device being supplied with power.

4. A mobile communication terminal device comprising:

an electrically writable/erasable memory including a first storage region for storing any information inherent to the mobile communication terminal device after encoding the same information as encoded information and having a second region for storing the information before encoding as stored information;

comparator means coupled to said memory for decoding said encoded information in said first storage region and thereafter comparing the decoded information with said stored information stored in said second storage region; and disabling means responsive to said comparator means for disabling speech operation of said device upon incoincidence between said decoded information and said stored information.

5. A mobile communication terminal device according to claim 4 wherein said information is a serial number of the device.

6. A mobile communication terminal device according to claim 4 wherein said memory includes a third storage region for storing a state allowing writing of information from outside the device and a state prohibiting writing of information from outside the device.

* * * * *